United States Patent Office 2,834,733
Patented May 13, 1958

2,834,733

HYDRAULIC FLUID AND LUBRICANT COMPOSITION

Douglas H. Moreton, Pacific Palisades, Calif., assignor to Douglas Aircraft Company, Inc., Santa Monica, Calif.

No Drawing. Application April 1, 1949
Serial No. 85,042

15 Claims. (Cl. 252—49.8)

This invention relates to a fluid composition useful particularly for transmitting power in hydraulic power systems and especially as a non-flammable hydraulic fluid in the hydraulic systems of aircraft and to a method of transmitting power in and of lubricating the parts of a hydraulic system.

A number of fluids are known which are intended for use to transmit power in hydraulic systems including some known fluids intended for use in the hydraulic systems of airplanes. However, the hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, et cetera employed in the hydraulic systems of aircraft which are exceedingly severe on the fluid used. It should be chemically stable to resist such chemical reactions as oxidation, decomposition, et cetera so that it will remain stable under conditions of use against loss of desired characteristics due to high and sudden changes of pressure, temperature, high shearing stresses, and contact with various metals which may be, for example, aluminum, bronze, steel, et cetera. It should also not deteriorate the gaskets or packings of the hydraulic system. It must not adversely affect the materials of which the system is constructed, and in the event of a leak should not adversely affect the various parts of the airplane with which it may accidentally come in contact. It should not be toxic or harmful to personnel who may come in contact with it. Furthermore, in addition to all such requisites for aircraft use, the fluid must be sufficiently non-flammable to meet aircraft requirements.

Numerous hydraulic fluid mixtures have been suggested. Light petroleum oil fractions to which suitable pour point depressants, viscosity index improvers, inhibitors, et cetera have been added are among the best so far proposed and these have been used somewhat extensively as aircraft hydraulic fluids. These materials, however, are too readily flammable, have a low autogenous ignition temperature, burn readily once ignited and have a high heat value. These characteristics are particularly undesirable in aircraft where necessity dictates the use of hydraulic lines in close proximity to electrical systems and to engines where a leakage of hydraulic fluid at high pressure through a crash of the airplane or failure of the hydraulic system while in flight may result in fire. None of these prior materials will meet the requirements of an aircraft hydraulic fluid and at the same time be sufficiently non-flammable to meet this exceedingly important requirement for aircraft use.

In many hydraulic systems power must be transmitted and the frictional parts of the systems lubricated by the hydraulic fluid used. The parts which are so lubricated include the frictional surfaces of the source of power, which is usually a pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable-displacement piston pump, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

Accordingly, a large number of requirements are placed on the method of performing these functions of transmitting power in and lubricating the frictional parts of such hydraulic systems, depending upon the particular hydraulic system and its particular use. Among the stringent requirements of the method of transmitting power in and lubricating the parts of such a system are that it must be done by means of a fluid having satisfactory properties such as low viscosity at low temperatures of use, high viscosity at high temperatures of use, low rate of change of viscosity with temperature over the temperature range of use, particularly high viscosity index, lubricating properties, density, chemical stability, resistance to oxidation, resistance to emulsification, resistance to the formation of gum or sludge.

Good lubricating properties are especially important. These particularly include lubricity and film strength. Good lubricity and film strength lessen wear of moving parts in pumps and valves where the clearance between frictional surfaces may be so small that only microscopically thin films of lubricant are possible. Pressures between some of the moving parts may be very high. To avoid excessive wear or seizure, especially in the case of high fluid pressure, the hydraulic fluid should provide a strong lubricating film which will resist the pressure and wiping action between the moving parts at the temperatures of operation. Wear of the parts of a hydraulic system allows internal leakage and excessive frictional heat. Load-carrying capacity or lubricity is also important in some hydraulic systems. Wear at the glands and stuffing boxes of the hydraulic system is undesirable because it leads to external leakage of the fluid. Accordingly, it is desirable that the hydraulic fluid also lubricate the areas of contact with the sealing means. The situation with respect to such hydraulic systems to which my invention relates is in general known to the art and is generally described in the trade publication entitled "Hydraulic Systems Circulating Oils for Machine Tools (Machine Shop Series)" (1943) of the Socony-Vacuum Oil Company, Inc., 26 Broadway, New York, N. Y. Patent 2,355,357 to H. W. Adams et al., issued August 8, 1944, discloses a hydraulic system for airplanes which is also illustrative of a type of hydraulic system to which my invention relates. DC4 Maintenance Manual, volume III, Section 1, Hydraulics, Douglas Service, April 1947, pages 10 and 11, and February 1948, pages 10 and 11, all published by Douglas Aircraft Company, Inc., Santa Monica, California, also disclose hydraulic systems for airplanes which are illustrative of the type of hydraulic system to which my invention realtes. Also, the cabin supercharger drive system of the DC-6 airplane, described in "Douglas Service," February 1948, published by Douglas Aircraft Company, Inc.

The requirements for the hydraulic system of an airplane are particularly severe. These include a good lubricity to effectively lubricate the moving parts of the system, satisfactory viscosity at low as well as high temperatures at which the aircraft may have to operate, low rate of change of viscosity with temperature, particularly high viscosity index, stability under conditions of use against loss of the desired characteristics due to high and sudden changes of pressure, temperature, high shearing stresses, non-corrosiveness to metal parts which may be of bronze, aluminum, steel et cetera, and the property of not deteriorating gaskets or packings, and in addition to all such requirements for aircraft use, the fluid must also be highly non-flammable or fire-resistant. The parts of the hydraulic system of aircraft are required to be as light in weight as possible and this factor results in imposing additional severe lubrication requirements and usually higher fluid temperatures.

Among the particular frictional surfaces which must be lubricated are hard steel on hard steel, particularly ball bearings and gear teeth, hard steel on cast iron, particularly sliding friction between such surfaces, hard steel on bronze or alloy bronze, such as between the steel piston and bronze cylinder of a Vickers pump, and metal in contact with elastomer seals, particularly steel or bronze on neoprene, Buna N, butyl rubber, silastic rubber, and natural rubber. The hard steel may be chrome plated.

In accordance with this invention, the discovery has been made that hydraulic fluids surprisingly satisfactory for aircraft hydraulic systems can be made by compounding a relatively small proportion of a suitable resinous or polymerized alkyl methacrylate (poly alkyl methacrylate) with a major proportion of a suitable monoalkyl diaryl phosphate, and a method has been discovered which makes it possible to transmit power in and to lubricate the parts of such hydraulic systems by means of such compositions.

The monoalkyl diaryl phosphates suitable for the purposes of this invention particularly include those in which the two aryl groups may be phenyl, cresyl or xylyl radicals (where the two aryl groups may be identical or different) and the alkyl group is a saturated alkyl radical having from 1 to 10 carbon atoms, preferably from 4 to 8 carbon atoms, and preferably branched chain or iso-alkyl, and more preferably where the branched chain contains at least two branches. Moreover, for certain purposes, especially including use at extremely low temperatures, a monoalkyl diaryl phosphate is preferred which is either (1) a monoalkyl diphenyl phosphate in which the alkyl radical is a saturated branched chain having from 1 to 8 carbon atoms, preferably with at least two branches to the chain, particularly for low viscosity at low temperatures, or (2) a monoalkyl diaryl phosphate in which the alkyl radical is preferably branched chain having from 1 to 10 carbon atoms, preferably with at least two branches to the chain, and in which the aryl radicals are phenyl, cresyl or xylyl, with at least one of them cresyl or xylyl, that is, with at least one of the aryl radicals having at least one methyl substituent, and preferably in which the aryl radicals are cresyl or xylyl, that is, where each of the aryl radicals has at least one methyl substituent, particularly for inhibiting crystallization at extremely low temperatures. Moreover, for this latter group, the alkyl group is preferably from 1 to 6 carbon atoms for a lower viscosity at low temperatures.

Phosphates suitable for the purpose of this invention may be represented by the formula

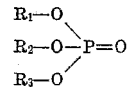

where $R_1$ may be phenyl, cresyl or xylyl, $R_2$ may be phenyl, cresyl or xylyl and $R_3$ a saturated alkyl group having from 1 to 10 carbon atoms, preferably from 4 to 8 carbon atoms, and preferably branched chain or iso-alkyl and more preferably where the branched chain contains at least two branches or side chains. When $R_1$ and $R_2$ are both phenyl groups, it is preferred that $R_3$ have from 1 to 8 carbon atoms for certain purposes, especially including use at extremely low temperatures, and preferably branched chain and more preferably have at least two branches to the chain. In general, for use at extremely low temperatures, the monoalkyl group is preferably a saturated branched chain, preferably with at least two branches, with at least one of the two aryl groups having at least one methyl substituent, that is, $R_1$ or $R_2$, and preferably both should be cresyl or xylyl. Furthermore, mixtures of such phosphates may be used, especially as particularly pointed out below.

By way of exemplification, such phosphates suitable for the purpose of my invention include the alkyl diphenyl phosphates, the alkyl phenyl cresyl phosphates, the alkyl dicresyl phosphates, the alkyl phenyl xylyl phosphates, the alkyl dixylyl phosphates, the alkyl cresyl xylyl phosphates in which the alkyl groups are illustrated by the following:

$C_1$ alkyl group:
  Methyl                      $CH_3-$ $C_2$ alkyl group:
  Ethyl                        $CH_3.CH_2-$ $C_3$ alkyl groups:
1. Normal propyl     $CH_3.CH_2.CH_2-$
2. Isopropyl          $(CH_3)_2.CH-$ $C_4$ alkyl groups:
1. Normal butyl      $CH_3.(CH_2)_2.CH_2-$
2. Isobutyl            $(CH_3)_2CH.CH_2-$
3. Secondary butyl   $CH_3.CH_2.\underset{CH_3}{C-}$
4. Tertiary butyl       $(CH_3)_3.C-$ $C_5$ alkyl groups:
1. Normal amyl       $CH_3.(CH_2)_3CH_2-$
2. Iso-amyl           $(CH_3)_2CH.CH_2.CH_2-$
3. 2-methyl butyl    $CH_3.CH_2.\underset{CH_3}{CH.CH_2-}$
4. 2,2-dimethyl propyl  $CH_3.\underset{CH_3}{\overset{CH_3}{C}}.CH_2-$
5. 1-methyl butyl     $CH_3(CH_2)_2.\underset{CH_3}{CH-}$
6. Diethyl methyl    $CH_3.CH_2.\underset{CH_3}{\overset{H}{\underset{CH_2}{C-}}}$
7. 1,2-dimethyl propyl  $CH_3.\underset{CH_3CH_3}{CH.CH-}$
8. Tertiary amyl      $CH_3.CH_2.\underset{CH_3}{\overset{CH_3}{C-}}$ $C_6$ alkyl groups:
1. Normal hexyl
$$CH_3.(CH_2)_4CH_2—$$
2. 1-methyl amyl
$$CH_3.(CH_2)_3CH—\atop CH_3$$
3. 1-ethyl butyl
$$CH_3.(CH_2)_2CH—\atop C_2H_5$$
4. 1,2,2-trimethyl propyl
$$(CH_3)_3C.CH—\atop CH_3$$
5. 3,3-dimethyl butyl
$$(CH_3)_3C.CH_2.CH_2—$$
6. 1,1,2-trimethyl propyl
$$(CH_3)_2.CH.\overset{CH_3}{\underset{CH_3}{C}}—$$
7. 2-methyl amyl
$$CH_3.(CH_2)_2.CH.CH_2—\atop CH_3$$
8. 1,1-dimethyl butyl
$$CH_3(CH_2)_2\overset{CH_3}{\underset{CH_3}{C}}—$$
9. 1-ethyl 2-methyl propyl
$$CH_3\overset{CH_3}{\underset{C_2H_5}{CH.C}}—$$
10. 1,3-dimethyl butyl
$$CH_3.CH_2.CH_2CH—\atop CH_3 \quad CH_3$$
11. Isohexyl
$$(CH_3)_2CH.(CH_2)_2CH_2—$$
12. 3-methyl amyl
$$CH_3.CH_2.CH.CH_2CH_2—\atop CH_3$$
13. 1,2-dimethyl butyl
$$CH_3.CH_2.\overset{CH_3}{CH}.CH—\atop CH_3$$
14. 1-methyl 1-ethyl propyl
$$CH_3CH_2\overset{CH_3}{\underset{C_2H_5}{C}}—$$
15. 2-ethyl butyl
$$CH_3CH_2.CH.CH_2—\atop C_2H_5$$

$C_7$ alkyl groups:
1. Normal heptyl
$$CH_3(CH_2)_5CH_2—$$
2. 1,1,2,2-tetramethyl propyl
$$CH_3.\overset{CH_3}{\underset{CH_3}{C}}.\overset{CH_3}{\underset{CH_3}{C}}—$$
3. 1,2-dimethyl 1-ethyl propyl
$$CH_3.\overset{CH_3}{CH}.\overset{CH_3}{\underset{C_2H_5}{C}}—$$
4. 1,1,2-trimethyl butyl
$$CH_3.\overset{CH_3}{CH}.CH_2.\overset{CH_3}{\underset{CH_3}{C}}—$$
5. 1-isopropyl 2-methyl propyl
$$CH_3.\overset{CH_3}{CH}.CH—\atop CH(CH_3)_2$$
6. 1-methyl 2-ethyl butyl
$$CH_3.CH_2.\overset{CH_3}{CH}.CH—\atop C_2H_5$$
7. 1,1-diethyl propyl
$$CH_3.CH_2.\overset{C_2H_5}{\underset{C_2H_5}{C}}—$$
8. 2-methyl hexyl
$$CH_3(CH_2)_3CH.CH_2—\atop CH_3$$
9. 1,1-dimethyl amyl
$$CH_3(CH_2)_3\overset{CH_3}{\underset{CH_3}{C}}—$$
10. 1-isopropyl butyl
$$CH_3.CH_2.CH_2CH—\atop CH(CH_3)_2$$
11. 1-ethyl 3-methyl butyl
$$CH_3.\overset{CH_3}{CH}.CH_2.CH—\atop C_2H_5$$
12. 1,4-dimethyl amyl
$$CH_3.\overset{CH_3}{CH}.CH_2.CH_2.CH_2—\atop CH_3$$
13. Isoheptyl
$$(CH_3)_2CH(CH_2)_3CH_2—$$
14. 1-methyl 1-ethyl butyl
$$CH_3.CH_2.CH_2.\overset{CH_3}{\underset{C_2H_5}{C}}—$$
15. 1-ethyl 2-methyl butyl
$$CH_3.CH_2.\overset{CH_3}{CH}.CH—\atop C_2H_5$$
16. 1-methyl hexyl
$$CH_3(CH_2)_4CH—\atop CH_3$$
17. 1-propyl butyl
$$CH_3.CH_2.CH_2.CH—\atop C_3H_7$$

$C_8$ alkyl groups:
1. Normal octyl
$$CH_3(CH_2)_6CH_2—$$
2. 1-methyl heptyl
$$CH_3(CH_2)_5CH—\atop CH_3$$
3. 1,1-diethyl 2-methyl propyl
$$CH_3.\overset{CH_3}{CH}.\overset{C_2H_5}{\underset{C_2H_5}{C}}—$$
4. 1,1,3,3-tetra methylbutyl
$$CH_3.\overset{CH_3}{\underset{CH_3}{C}}.CH_2.\overset{CH_3}{\underset{CH_3}{C}}—$$
5. 1,1-diethyl butyl
$$CH_3.CH_2.CH_2.\overset{C_2H_5}{\underset{C_2H_5}{C}}—$$
6. 1,1-dimethyl hexyl
$$CH_3(CH_2)_4\overset{CH_3}{\underset{CH_3}{C}}—$$
7. 1-methyl 1-ethyl amyl
$$CH_3(CH_2)_3\overset{CH_3}{\underset{C_2H_5}{C}}—$$
8. 1-methyl 1-propyl butyl
$$CH_3.CH_2.CH_2.\overset{CH_3}{\underset{C_3H_7}{C}}—$$
9. 2-ethyl hexyl
$$CH_3(CH_2)_3CH.CH_2—\atop C_2H_5$$
10. 6-methyl heptyl (iso-octyl)
$$CH_3.CH(CH_2)_4CH_2—\atop CH_3$$

$C_9$ alkyl groups:
1. Normal nonyl
$$CH_3(CH_2)_7CH_2—$$
2. 1-methyl octyl
$$CH_3(CH_2)_6CH—\atop CH_3$$
3. 1-ethyl heptyl
$$CH_3(CH_2)_5CH—\atop C_2H_5$$
4. 1,1-dimethyl heptyl
$$CH_3(CH_2)_5\overset{CH_3}{\underset{CH_3}{C}}—$$
5. 1-ethyl 1-propyl butyl
$$CH_3.CH_2.\overset{C_3H_7}{\underset{C_3H_7}{C}}—$$
6. 1,1-diethyl 3-methyl butyl
$$CH_3.\overset{CH_3}{CH}.CH_2.\overset{C_2H_5}{\underset{C_2H_5}{C}}—$$
7. Di-isobutyl methyl
$$[(CH_3)_2CH.CH_2]_2CH—$$
8. 3,5,5-trimethyl hexyl
$$(CH_3)_3C.CH_2CH.CH_2.CH_2—\atop CH_3$$
9. 3,5-dimethyl heptyl
$$CH_3.CH_2.\overset{CH_3}{CH}.CH_2.CH.CH_2.CH_2—\atop CH_3$$

$C_{10}$ alkyl groups:
1. Normal decyl
$$CH_3(CH_2)_8CH_2—$$
2. 1-propyl heptyl
$$CH_3(CH_2)_5CH—\atop C_3H_7$$
3. 1,1-diethyl hexyl
$$CH_3(CH_2)_4\overset{C_2H_5}{\underset{C_2H_5}{C}}—$$
4. 1,1-dipropyl butyl
$$CH_3(CH_2)_2\overset{C_3H_7}{\underset{C_3H_7}{C}}—$$
5. 2-isopropyl 5-methyl hexyl
$$CH_3.\overset{CH_3}{CH}(CH_2)_2CH.CH_2—\atop CH(CH_3)_2$$

As used herein, the term "cresyl" indicates the tolyl or methyl phenyl radical and "xylyl" the dimethyl phenyl radical. The cresyl radicals may be ortho, meta or para or mixtures thereof, but are usually mixtures of meta and para to avoid the toxic effect of the ortho isomer. Any of the isomers of the xylyl radicals may be used, or mixtures thereof.

The poly alkyl methacrylates suitable for the purpose of this invention are in general those resulting from the polymerization of alkyl methacrylates in which the alkyl groups may have from about 4 to 12 carbon atoms. The alkyl groups may be mixtures such as derived from a mixture of alcohols, and in which case there may be included some alkyl groups having as low as 2 carbon atoms and as high as about 18 carbon atoms. The number of carbon atoms in the alkyl group should be such that the polymer is compatible with the particular phosphate used. Usually it will be found that the lower the alkyl group of the phosphate the lower should be the alkyl group of the methacrylate. Usually, it will be satisfactory for the alkyl group of the methacrylate monomer to be from about 8 to 10 carbon atoms. The alkyl group may be a branched chain, or iso-alkyl. The molecular size of the polymerized alkyl methacrylate should be great enough to increase the viscosity of the monoalkyl diaryl phosphate to which added, and small enough to be compatible therewith. In general, the average molecular weight will be within about 8,000 to 12,000. The poly alkyl methacrylate should be such and in sufficient proportion to increase the viscosity at elevated temperatures (such as 210° F., for example) and to increase the viscosity index, preferably to at least 100, or more preferably to above 150.

In compounding the compositions of this invention, the alkyl methacrylite polymer may be added to the phosphate or mixture of phosphates, or the monomer may be polymerized in situ in the phosphate or mixture of phosphates by adding the unpolymerized alkyl methacrylate ester thereto and then polymerizing the monomer to the desired degree.

Suitable poly alkyl methacrylates for the purposes of this invention are made and sold by and are available from the Rohm and Haas Company, Philadelphia, Pennsylvania, under its trade mark Acryloid and particularly designated, for example, as Acryloid HF–845, Acryloid HF–855, Acryloid HF–860. In these designations the last two numerals, that is, "45," "55" and "60," denote the viscosity in centistokes of the poly alkyl methacrylate contained in the commercial product measured in a 30 weight percent solution in toluene at 100° F., or other standard base stock having the viscosity of toluene at 100° F. In general, these polymers have a molecular weight within the range of about 5,000 to 18,000. Usually, the alkyl radicals of these polymerized alkyl methacrylates will be $C_8$, but may be $C_8$–$C_{10}$.

Usually a minor proportion and particularly from 0.2 to 10 percent by volume of the poly alkyl methacrylate (exclusive of any solvent) will be found satisfactory, and preferably a proportion within the range from 1 to 5 percent. This percentage of poly alkyl methacrylate is based on the sum of the phosphate and polymer as being 100 percent.

My invention will be further illustrated by the following examples:

EXAMPLE 1

A poly octyl methacrylate having an average molecular weight of about 10,000 and a range of about 5,000 to 18,000 in toluene solution, obtained from the Rohm and Haas Company under its trademark designation Acryloid HF–845, was stripped of the toluene solvent. Two percent of the resulting substantially pure poly octyl methacrylate was mixed with and dissolved in 98 percent by volume of 2-ethyl hexyl diphenyl phosphate. The poly octyl methacrylate, without the toluene solvent, was an exceedingly heavy material, almost a solid, and dissolved in the octyl diphenyl phosphate in about two days, with occasional stirring, at 100° C. The results of tests on the resulting liquid are shown in the Table I below.

EXAMPLE 2

A poly octyl methacrylate having an average molecular weight of about 10,000 and a range of about 5,000 to 18,000, dissolved in 45 percent by volume of a light petroleum oil of 200° F. flash point, obtained from the Rohm and Haas Company under its trademark designation Acryloid HF–855, in proportion of 5 percent by volume was mixed with and dissolved into 95 percent by volume of 2-ethyl hexyl diphenyl phosphate. In this case the light petroleum acted as a mutual solvent for the poly octyl methacrylate and the octyl diphenyl phosphate and facilitated making the desired liquid solution. Since only a small proportion (5 percent) of the commercial Acryloid HF–855 was added to the octyl diphenyl phosphate, the proportion of the light petroleum oil was not great enough to impart any undesirable properties to the final liquid product. Table I below shows the result of tests made on the resulting liquid product.

*Table I*

| | 2-ethyl hexyl diphenyl phosphate | Fluid of Example 1 | Fluid of Example 2 |
|---|---|---|---|
| Specific Gravity, 60/60 | 1,098 | 1.083 | 1.076. |
| Pour Point | Below −60° F | −60° F | −60° F. |
| Neutralization Number (milligrams KOH/gram) | | | 0.16. |
| Viscosity (centistokes): | | | |
| −30° F | 2,167 | 2,440 | 2,290. |
| 100° F | 10.1 | 13.4 | 14.6. |
| 210° F | 2.46 | 3.37 | 3.71. |
| Viscosity Index (A. S. T. M.) | 65 | 143 | 163. |
| Flammability: | | | |
| Autogenous Ignition Temperature (A. S. T. M. D286-30) | 1050° F | 1060° F | 1050° F. |
| Spray Test | | No increase in fire | Decrease in fire. |
| High Temperature Ignition Test | | Flashes with great difficulty. | Flashes with great difficulty. |
| Manifold Test: | | | |
| Burns on tube | | No | No. |
| Bottom of shield | | Does not burn | Does not burn. |

These tests for "Flammability" were made in accordance with the standard tests, F–3–b–Flammability—Spray Test, F–3–c–Flammability—High Temperature Ignition Test, and F–3–d–Flammability—Manifold Test, appearing on pages 4 and 5 of the Aircraft Industries Association of America, Inc., Proposed Specification for Non-flammable Type Hydraulic Fluid, July 21, 1947, now SAE Specification AMS 3150, issued May 1, 1948. The fluids of this invention satisfactorily meet all the specification requirements on non-flammability of the Aircraft Industries Association of America, Inc.

Since certain parts of the hydraulic systems of aircraft such as gaskets and the diaphragm of the accumulator are made of rubber or some synthetic elastomer, the swelling effect of the hydraulic fluid used upon such rubber or other elastomer is important. Most proposed non-flammable type hydraulic fluids will swell all such elastomers about 20 percent or more, which is unsatisfactorily large. The fluid of Example 2, however, was found to swell butyl rubber, one of the synthetic elastomers of which gaskets and the diaphragm can be made, only 4.7 percent. Thus with the fluid of this invention it is possible to select a suitable elastomer which will not swell unduly in use with the hydraulic fluid.

In order to further illustrate the utility and surprising results obtained with compositions of this invention, the fluid of Example 2 was subjected to severe test conditions in a hydraulic system especially constructed to be substantially identical with the hydraulic power system of an airplane excepting only the slave units and the length of hydraulic lines, but run under extreme conditions of temperature, pressure and high pumping rate such as are present under take-off conditions involving high power demand on the hydraulic system and a high operating temperature of 160° F. This test system includes all the functional parts as used in an airplane under extreme practical operating conditions. This system is shown in Sketch 4 of the AIA Proposed Specification for Non-Flammable Type Hydraulic Fluid, July 21, 1947, referred to above.

Ten gallons of the fluid of Example 2 were placed in the reservoir of the system and the system brought up to stable operating conditions at a pump discharge pressure of 3,000 pounds per square inch and at an operating temperature of 160° F. This fluid showed excellent stability and ran the phenomenal length of time of 450 hours (well over 25,000 system cycles and equivalent to about 4,500 flight hours). No difficulties appeared during this extremely long period of operation and the test was discontinued, not because of any failure of any kind, but simply because the satisfactoriness of the fluid was amply demonstrated. During this test the following tests were made with the results indicated in Table II below:

Table II

| Hours of Operation | Neut. No. | Viscosity @ 100° F. in centistokes |
| --- | --- | --- |
| 0 | 0.16 | 14.4 |
| 5 | 0.17 | 13.2 |
| 7 | 0.16 | 12.8 |
| 16 | 0.17 | 12.7 |
| 25 | 0.15 | 12.5 |
| 42 | 0.16 | 12.4 |
| 58 | 0.19 | 12.3 |
| 74 | 0.15 | 12.3 |
| 90 | 0.17 | 12.2 |
| 140 | 0.15 | 12.0 |
| 164 | 0.18 | 12.1 |
| 243 | 0.15 | 11.9 |
| 323 | 0.22 | 11.8 |
| 398 | 0.27 | 11.9 |
| 450 End of test | 0.35 | 11.7 |

The composition of this invention has an extremely low coefficient of friction and high film strength so that its lubricity is exceedingly high, fitting it eminently for lubricating the moving parts of heavy duty hydraulic systems. Although a Vickers pump usually wears out in 200 hours of operation with ordinary hydraulic fluids in such a system, no wear was measurable up to 200 hours of operation with the fluid of Example 2. Furthermore, after the test was discontinued at the end of 450 hours, the Vickers pump appeared to be in excellent condition. The exceedingly small wear on the parts of the Vickers pump is shown in the following table:

Table III

| Vickers Pump Part | | Weight in grams | |
| --- | --- | --- | --- |
| Number | Part | Before test | After 450 hrs. |
| 83279 | Valve plate | 552.5 | 551.8 |
| 83278 | Cylinder block | 184.429 | 184.220 |
| 79063 | Thrust knuckle | 5.705 | 5.703 |
| 59561 | Small thrust knuckle | 2.670 | 2.630 |

EXAMPLE 3

95% by volume 6-methyl heptyl diphenyl phosphate.
5% by volume Acryloid HF–855.
Pour point _____°F__ Below −90
Viscosity at:
    210° F _____centistokes__ 3.8
    100° F _____do____ 15.2
    −30° F _____do____ 2,100
Neut. No_____ 0.28
Autogenous ignition temperature (ASTM)__°F__ 1050

Although the fluids of Examples 1, 2 and 3 above perform outstandingly, particularly as hydraulic fluids for aircraft, their use at extremely low temperatures, especially in hydraulic systems in which the pump may not be operating or the fluid is static or undisturbed for periods of time at extremely low temperatures, may be somewhat limited due to a tendency to solidify or crystallize in containers of certain configurations due to what appears to be caused by supercooling. This phenomenon appeared particularly with respect to the fluid of Example 2 when an accumulator similar to the one of the hydraulic testing system referred to above containing the fluid was subjected to the temperature of −30° F. for three days with no motion in the fluid and with the fluid under a pressure of about 50 pounds per square inch.

However, the further discovery has been made that compositions in accordance with my invention can be produced which are not only highly satisfactory as hydraulic fluids for aircraft, as is the case with respect to the fluids of Examples 1, 2 and 3 above, but which in addition do not crystallize at extremely low temperatures or exhibit this phenomenon at much lower temperatures. It is a significant additional feature of my invention that this can be done by the use of mixtures of particular monoalkyl diaryl phosphates selected from the group set forth in the foregoing disclosure.

The mixtures of monoalkyl diaryl phosphates referred to above may be obtained by mixing two or more particular monoalkyl diaryl phosphates, such as, for example, a mixture of iso-octyl diphenyl phosphate and iso-hexyl diphenyl phosphate or two isomeric octyl diphenyl phosphates. Such a mixture of monoalkyl diaryl phosphates may also be derived by making the monalkyl diaryl phosphate with a mixture of alcohols, particularly a mixture of alkyl alcohols, to supply the alkyl groups, resulting in a mixture of monoalkyl diphenyl phosphates, for example, with differing alkyl groups. Such mixtures from alcohols may be derived, for example, from petroleum sources, as for example, from a petroleum cut of olefins made into a mixture of alcohols by reaction with carbon monoxide and hydrogen, in accordance with the Oxo process. (See, for example, "Alcohols above $C_3$ produced from olefins, CO and hydrogen," Chemical Industries, February 1947, pages 232–233.) Such a petroleum hydrocarbon cut of olefins may contain, for example, a range of olefins from $C_3$ to $C_7$ which when made into alcohols by the Oxo process result in a mixture of $C_4$ to $C_8$ alcohols, including isomeric forms of the same number of carbon atoms. Such a cut of olefins may also be, for example, substantially $C_7$ olefin isomers, which when made into alcohols by the Oxo process result in a mixture of isomers of $C_8$ alcohols. When such alcohol mixtures are used to produce alkyl diphenyl phosphate, for example, a corresponding mixture of $C_8$ alkyl diphenyl phosphates results. Any such mixture of alkyl groups may be used, particularly including a mixture of $C_5$, $C_5$ and $C_6$, $C_6$, $C_6$ and $C_7$, $C_7$, $C_7$ and $C_8$, $C_8$, $C_8$ and $C_9$, or broader ranges.

The following examples illustrate such mixtures made in accordance with my invention:

EXAMPLE 4

95% by volume of mixture:
  50% by volume 2-ethyl hexyl diphenyl phosphate;
  50% by volume 6-methyl heptyl diphenyl phosphate.
5% by volume of Acryloid HF-855.
Viscosity at:
  210° F _____ centistokes__ 3.85
  100° F _____ do____ 15.0
  −30° F _____ do____ 2,256
Viscosity index _____ 165
Pour point _____ ° F__ −70
Specific gravity (60/60) _____ 1.079
Autogenous ignition temperature (ASTM)__° F__ 1050
Crystallization on standing at low temperature _____ No crystallization to −40° F.

The crystallization phenomenon observed for the fluid of Example 2 above, using 2-ethyl hexyl diphenyl phosphate, was also observed for the substantially pure 6-methyl heptyl (iso-octyl) diphenyl phosphate when used without admixture with the 2-ethyl hexyl diphenyl phosphate, but when mixed as in Example 4, it was surprisingly discovered that no such crystallization occurred to −40° F.

The following are other examples of different proportions of the two alkyl diphenyl phosphates:

EXAMPLE 5

95% by volume of mixture:
  70% by volume 2-ethyl hexyl diphenyl phosphate;
  30% by volume 6-methyl heptyl diphenyl phosphate.
5% by volume of Acryloid HF-855.
Pour point, below −60° F.

EXAMPLE 6

95% by volume of mixture:
  30% by volume 2-ethyl hexyl diphenyl phosphate;
  70% by volume 6-methyl heptyl diphenyl phosphate.
5% by volume of Acryloid HF-855.
Pour point, below −60° F.

The following are examples of the use of a mixture of alkyl diphenyl phosphates, the alkyl groups of which are derived from a mixture of alcohols made from a petroleum olefin cut transformed to alcohols by the Oxo process.

EXAMPLE 7

95% by volume mixed $C_8$-alkyl diphenyl phosphate;
5% by volume Acryloid HF-855.
Pour point, −70° F.

This composition showed no tendency to crystallize as did the fluid of Example 2 at temperatures as low as −40° F.

The mixed $C_8$ alkyl of this alkyl diphenyl phosphate was derived from a mixture of alcohols made from a petroleum cut of olefins, predominantly $C_7$, but containing some $C_6$ and $C_8$, which were converted to the corresponding alcohols by the Oxo process to produce a mixture of alcohols predominantly $C_8$ but containing some $C_7$ and $C_9$. The particular alkyl groups of this mixture of alkyl diphenyl phosphates were about 55–65% iso-octyl (6-methyl heptyl), about 5–10% $C_9$ alkyl groups, with the rest predominantly other $C_8$ isomers and a small amount of $C_7$ isomers. This mixed $C_8$-alkyl diphenyl phosphate had the following properties:

Viscosity at:
  210° F _____ centistokes__ 2.69
  100° F _____ do____ 11.2
  0° F _____ do____ 337
  −40° F _____ do____ 7,988
Pour point _____ ° F__ Below −65

The fluid of this example in addition to being highly satisfactory as a hydraulic fluid for aircraft, had the additional property of not crystallizing at extremely low temperatures, due to the mixture of phosphates.

EXAMPLE 8

95% by volume of mixture:
  50% 2-ethyl hexyl diphenyl phosphate;
  50% mixed $C_8$-alkyl diphenyl phosphate.
5% by volume of Acryloid HF-855.
Viscosity at:
  210° F _____ centistokes__ 3.98
  100° F _____ do____ 15.7
  −30° F _____ do____ 2,668
Neut. No. _____ 0.25
Pour Point _____ ° F__ −70
Specific gravity (60/60) _____ 1.080
Autogenous ignition temperature (ASTM)__° F__ 1040

This fluid showed no tendency to crystallize at −40° F.

The mixed $C_8$-alkyl diphenyl phosphate was the same as that used in Example 7 above.

The fluid was used as the hydraulic fluid and lubricant in the cabin supercharger drive mechanism of a DC-6 airplane for over 650 flight hours. Such a cabin supercharger system is described in "Douglas Service," February 1948, published by Douglas Aircraft Company, Inc., Santa Monica, California. Ordinary fluids used in such a system require changing at a maximum of about 200 flight hours and are of much higher viscosity with corresponding difficulties in low temperature operation which are avoided by the fluids of this invention.

EXAMPLE 9

95% by volume of mixed isomeric nonyl diphenyl phosphate;
5% by volume Acryloid HF-855.

The resulting mixture was tested and found to have the following properties:

Pour point _____ ° F__ −50
Viscosity at:
  210° F _____ centistokes__ 4.65
  100° F _____ do____ 19.3
  −30° F _____ do____ 5,100
Viscosity index _____ 174
Autogenous ignition temperature _____ ° F__ 1040

This fluid showed no tendency to crystallize at temperatures as low as −50° F.

The mixed isomeric nonyl diphenyl phosphate was a mixture of alkyl diphenyl phosphates, the alkyl groups of which were 90% 3,5,5-trimethyl hexyl and 10% 3,5-dimethyl heptyl.

Examples of other such mixtures are as follows:

EXAMPLE 10

95% by volume of mixture:
  70% by volume 2-ethyl hexyl diphenyl phosphate;
  30% by volume mixed isomeric nonyl diphenyl phosphate.
5% by volume Acryloid HF-855.
Pour point _____ ° F__ Below −60
Viscosity at:
  210° F _____ centistokes__ 4.06
  100° F _____ do____ 16.1
Viscosity index _____ 177

The fluid of this example did not crystallize at −30° F. as did the fluid of Example 2 but did crystallize at −40° F. under similar conditions, showing that the temperature at which such crystallization occurs had been depressed.

EXAMPLE 11

95% by volume of mixture:
  50% by volume 2-ethyl hexyl diphenyl phosphate;
  50% by volume mixed isomeric nonyl diphenyl phosphate.
5% by volume Acryloid HF-855.
Pour point _____ ° F__ Below −60
Viscosity at:
  210° F _____ centistokes__ 4.16
  100° F _____ do____ 16.7
Viscosity index _____ 175

EXAMPLE 12

95% by volume of mixture:
    30% by volume 2-ethyl hexyl diphenyl phosphate;
    70% by volume mixed isomeric nonyl diphenyl phosphate.
5% by volume Acryloid HF–855.
Pour point _____° F__ Below −60
Viscosity at:
    210° F _____centistokes__ 4.46
    100° F _____do____ 18.1
Viscosity index _____ 178

The mixed isomeric nonyl diphenyl phosphate of Examples 10, 11 and 12 was the same as that used in Example 7.

In general, for a satisfactorily low viscosity at low temperatures such as −30° F. and −40° F., it has been found that the alkyl group, particularly of the monoalkyl diphenyl phosphates, should have no more than 8 carbon atoms, and preferably less than 6 carbon atoms.

Still other fluids made in accordance with this invention which do not crystallize at extremely low temperatures, as pointed out above, are those made from the monoalkyl diaryl phosphates in which at least one of the aryl radicals has at least one methyl substituent and preferably those in which each of the two aryl groups has at least one methyl substituent, or mixtures thereof with other monoalkyl diaryl phosphates. These fluids are illustrated by the following examples:

EXAMPLE 13

95% by volume 2-ethyl hexyl dicresyl phosphate;
5% by volume Acryloid HF–855.

The resulting mixture was tested and found to have the following properties:

Pour point _____° F__ −55
Viscosity at:
    210° F _____centistokes__ 4.89
    100° F _____do____ 25.1
Viscosity index _____ 133
Autogenous ignition temperature_____° F__ 1040

The fluid of this example showed no tendency to crystallize at temperatures as low as −50° F.

EXAMPLE 14

95% by volume of mixture:
    70% by volume 2-ethyl hexyl diphenyl phosphate;
    30% by volume 2-ethyl hexyl dicresyl phosphate.
5% by volume Acryloid HF–855.
Pour point _____° F__ −55
Viscosity at:
    210° F _____centistokes__ 4.26
    100° F _____do____ 18.0
Viscosity index _____ 166

The fluid of this example did not crystallize at −30° F. as did the fluid of Example 2, but did so at −40° F., showing that the temperature at which such crystallization occurs had been materially lowered.

EXAMPLE 15

95% by volume of mixture:
    50% by volume 2-ethyl hexyl diphenyl phosphate;
    50% by volume 2-ethyl hexyl dicresyl phosphate.
5% by volume Acryloid HF–855.
Pour point _____° F__ −55
Viscosity at:
    210° F _____centistokes__ 4.45
    100° F _____do____ 19.8
Viscosity index _____ 156

EXAMPLE 16

95% by volume of mixture:
    30% by volume 2-ethyl hexyl diphenyl phosphate;
    70% by volume 2-ethyl hexyl dicresyl phosphate.
5% by volume Acryloid HF–855.
Pour point _____° F__ −55
Viscosity at:
    210° F _____centistokes__ 4.49
    100° F _____do____ 21.0
Viscosity index _____ 146

The fluids of Examples 10 and 12 above were improved with respect to the temperature at which crystallization such as observed for Example 2 occurred and with the use of greater than 30% of the mixed isomeric nonyl diphenyl phosphate or the octyl dicresyl phosphate as in Examples 9, 11, 12, 15 and 16, the crystallization phenomenon as observed for the fluid of Example 2 did not appear.

The 2-ethyl hexyl dicresyl phosphate used in the examples above is made from a mixture of ortho, meta and para cresol from which the ortho cresol is substantially removed so that the cresyl radicals of the phosphate are a mixture substantially predominating in meta and para cresyl radicals. The proportion of meta and para isomers is approximately the same with some predominance of the meta isomer. The properties of this octyl dicresyl phosphate are given in Table IV below. Table IV also gives the properties of the mixed isomeric nonyl diphenyl phosphate used in the examples above.

Table IV

|  | 2-ethyl hexyl dicresyl phosphate | Mixed isomeric nonyl diphenyl phosphate |
|---|---|---|
| Pour Point _____°F__ | −50 | −60 |
| Viscosity (centistokes): |  |  |
|   210 °F_____ | 3.12 | 2.88 |
|   100 °F_____ | 16.8 | 12.3 |
|   −30 °F_____ | 9,789 | 4,107 |
| Viscosity Index_____ | 18 | 86 |
| Autogenous Ignition Temperature_____°F__ | 1,060 | 1,020 |
| Neutralization Number_____ | 0.04 | 0.03 |

The following is an example of a composition of this invention similar to the composition of Example 8 above but in which the alkyl methacrylate polymer was polymerized in some of the mixture of alkyl diphenyl phosphates used to make the composition.

EXAMPLE 17

97% by volume of mixture:
    50% 2-ethyl hexyl diphenyl phosphates;
    50% mixed $C_8$-alkyl diphenyl phosphates.
3% by volume Acryloid G–5573X.

This composition had the following inspection properties:

Pour point _____° F__ −70
Viscosity at:
    210° F _____centistokes__ 3.54
    100° F _____do____ 14.9
    0° F _____do____ 416
    −40° F _____do____ 8,939
Viscosity index _____ 140
No cloud to_____° F__ −70
No crystallization at_____° F__ −40

The mixed $C_8$-alkyl diphenyl phosphate was the same as that used in Examples 7 and 8 above.

The Acryloid G–5573X was polymerized in 55% of the mixture of phosphates used in this example to an average molecular weight of about 10,000. It contained 45% polymers in solution in the mixture of phosphates.

These compositions of my invention were found surprisingly satisfactory for transmitting power in and lubricating the parts of an airplane hydraulic system having a Vickers axial-piston pump as the power source. In addition, these compositions also have a high degree of non-flammability or fire resistance making them eminently suitable as hydraulic fluids for airplanes. These compositions were found especially suitable as lubricants for the frictional surfaces of the hydraulic system. These particularly include the lubrication of the metal-on-metal and metal-on-elastomer surfaces referred to hereinabove. This lubrication is effected by maintaining a film of the composition between the frictional surfaces. It is especially surprising that both functions of transmitting power and lubrication can be so satisfactorily performed by the compositions of this invention while at the same time such compositions are eminently satisfactory in other respects for aircraft use.

This application is a continuation in part of my copending applications Serial Number 793,051, filed December 20, 1947, now abandoned; Serial Number 22,241, filed April 20, 1948, now abandoned; Serial Number 55,436, filed October 19, 1948; and Serial Number 55,435, filed October 19, 1948.

The foregoing describes my invention in its preferred aspects, and illustrates my invention by way of specific examples, but alterations and modifications may be made thereof without departing from the invention herein disclosed.

Having described my invention I claim:

1. The composition consisting essentially of a mixture of monoalkyl diaryl phosphates in which the aryl groups are members of the group consisting of phenyl, cresyl and xylyl radicals and the monoalkyl groups are branched chain having from 4 to 8 carbon atoms, and a sufficient proportion of a poly alkyl methacrylate having an average molecular weight of about 8,000 to 12,000 and in which the alkyl portion has from 4 to 12 carbon atoms to increase the viscosity of the composition at elevated temperatures and to increase the viscosity index of the composition.

2. The composition consisting essentially of a mixture of hexyl diphenyl phosphates in which the hexyl groups are a mixture of isomeric hexyl groups and a minor but sufficient proportion of a poly alkyl methacrylate in which the alkyl group has from 8 to 10 carbon atoms and an average molecular weight of about 8,000 to 12,000 to increase the viscosity of the composition at elevated temperatures and to increase the viscosity index of the composition.

3. The composition consisting essentially of a mixture of heptyl diphenyl phosphates in which the heptyl groups are a mixture of isomeric heptyl groups and a minor but sufficient proportion of a poly alkyl methacrylate in which the alkyl group has from 8 to 10 carbon atoms and an average molecular weight of about 8,000 to 12,000 to increase the viscosity of the composition at elevated temperatures and to increase the viscosity index of the composition.

4. The composition consisting essentially of a mixture of octyl diphenyl phosphates in which the octyl groups are a mixture of isomeric octyl groups and a minor but sufficient proportion of a poly alkyl methacrylate in which the alkyl group has from 8 to 10 carbon atoms and an average molecular weight of about 8,000 to 12,000 to increase the viscosity of the composition at elevated temperatures and to increase the viscosity index of the composition.

5. The composition consisting essentially of a mixture of nonyl diphenyl phosphates in which the nonyl groups are a mixture of isomeric nonyl groups and a minor but sufficient proportion of a poly alkyl methacrylate in which the alkyl group has from 8 to 10 carbon atoms and an average molecular weight of about 8,000 to 12,000 to increase the viscosity of the composition at elevated temperatures and to increase the viscosity index of the composition.

6. The composition consisting essentially of a mixture of 2-ethyl hexyl diphenyl phosphate and other isomeric octyl diphenyl phosphates predominantly 6-methyl heptyl diphenyl phosphate and a minor but sufficient proportion of a poly alkyl methacrylate in which the alkyl group has from 8 to 10 carbon atoms and an average molecular weight of about 8,000 to 12,000 to increase the viscosity of the composition at elevated temperatures and to increase the viscosity index of the composition.

7. The composition as defined in claim 6 in which the alkyl groups of said other isomeric octyl diphenyl phosphates are derived from alcohols made from a petroleum cut of olefins reacted to alcohols with carbon monoxide and hydrogen.

8. The composition as defined in claim 7 in which the proportion of the poly alkyl methacrylate is from about 0.2 to 10 percent by volume based on the mixture of polymer and phosphate as being 100 percent.

9. The composition consisting essentially of a mixture of monoalkyl diaryl phosphates in which the aryl groups are members of the group consisting of phenyl, cresyl and xylyl radicals and the monoalkyl group has from 1 to 10 carbon atoms, and a sufficient proportion of poly alkyl methacrylate in which the alkyl group has from 8 to 10 carbon atoms, and said poly alkyl methacrylate has an average molecular weight of about 8,000 to 12,000 to increase the viscosity of the composition at elevated temperatures and to increase the viscosity index of the composition.

10. The composition consisting essentially of a mixture of monoalkyl diaryl phosphates in which the aryl groups are members of the group consisting of phenyl, cresyl and xylyl radicals and the monoalkyl group has from 1 to 10 carbon atoms, and a sufficient proportion of poly alkyl methacrylate in which the alkyl radical has from 4 to 12 carbon atoms and is compatible with said phosphates to increase the viscosity of the composition at elevated temperatures and to increase the viscosity index of the composition.

11. The composition consisting essentially of a mixture of iso-octyl diphenyl phosphates, which mixture comprises from about 30–70 volume percent of 2-ethyl hexyl diphenyl phosphate and from about 70–30 volume percent of 6-methyl heptyl diphenyl phosphate, and a poly alkyl methacrylate effective to increase the viscosity index and viscosity at elevated temperature of said mixture in which the alkyl radical contains from 8 to 10 carbon atoms.

12. The composition as defined in claim 11 containing from about 0.2 to 10 percent of said poly alkyl methacrylate.

13. The composition consisting essentially of a mixture of iso-octyl diphenyl phosphates, which mixture contains from about 30 to 70 volume percent of 2-ethyl hexyl diphenyl phosphate and from about 70 to 30 volume percent of 6-methyl heptyl diphenyl phosphate, and said composition containing from about 0.2 to 10 percent of poly octyl methacrylate effective to increase the viscosity index and viscosity at elevated temperature of said mixture.

14. The composition as defined in claim 11 also containing a minor proportion of a light petroleum oil added to said composition as a solvent for said poly alkyl methacrylate.

15. The non-flammable hydraulic fluid and lubricating composition having an autogenous ignition temperature above 1000° F., a viscosity at 210° F. of at least 3.0 centistokes, a viscosity index above 150, a viscosity at minus 30° F. below 8000 centistokes consisting essentially of a mixture of from about 30 to 70 volume percent of 6-methyl heptyl diphenyl phosphate and from about 70 to 30 volume percent of 2-ethyl hexyl diphenyl phosphate, said mixture containing from about 0.2 to 10 volume percent of a poly alkyl methacrylate compatible with said mixture and effective to increase the viscosity index and viscosity at elevated temperature of said mixture.

References Cited in the file of this patent

UNITED STATES PATENTS

| | | |
|---|---|---|
| 1,376,043 | Sherwood | Apr. 26, 1921 |
| 1,666,871 | Calkins | Apr. 17, 1928 |
| 1,698,973 | Tseng | Jan. 15, 1929 |
| 1,891,962 | Tseng | Dec. 27, 1932 |
| 1,943,813 | Copeland | Jan. 16, 1934 |
| 2,004,506 | Moffitt | June 11, 1935 |
| 2,069,367 | Hollander | Feb. 2, 1937 |
| 2,091,627 | Bruson | Aug. 31, 1937 |
| 2,241,531 | Wiezevick | May 13, 1941 |
| 2,245,649 | Caprio | June 17, 1941 |
| 2,355,357 | Adams et al. | Aug. 8, 1944 |
| 2,408,983 | Kollen | Oct. 8, 1946 |
| 2,442,741 | Morgan et al. | June 1, 1948 |
| 2,461,279 | Huber | Feb. 8, 1949 |